March 24, 1931. E. PAUL 1,797,836
WORKHOLDER
Filed Nov. 7, 1929
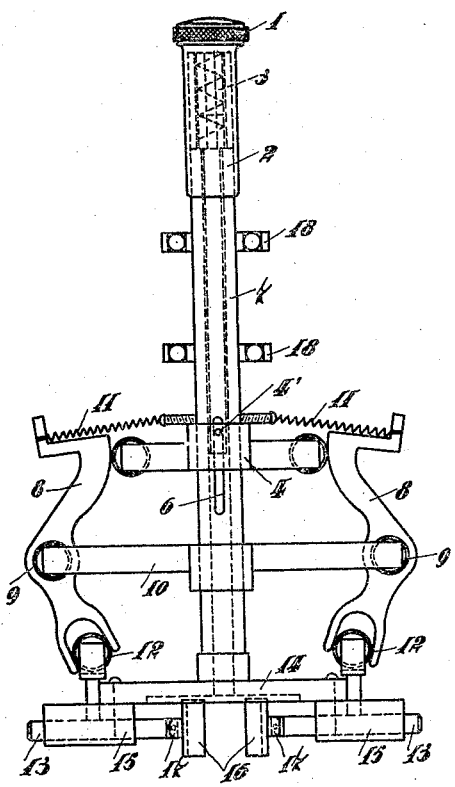
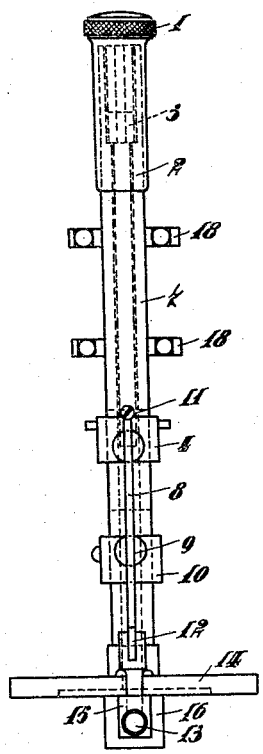
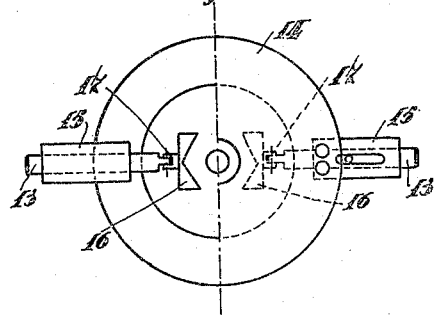
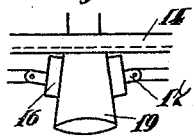
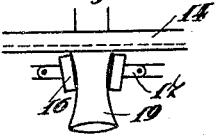
Inventor.
Edmond Paul.

Patented Mar. 24, 1931

1,797,836

UNITED STATES PATENT OFFICE

EDMOND PAUL, OF SOIGNIES, BELGIUM

WORK HOLDER

Application filed November 7, 1929, Serial No. 405,411, and in Belgium June 7, 1929.

The present invention relates to improvements in chucks or work holders, and more particularly to chucks for use in the working of articles of glass, capable of handling any such articles, whatever be their size and shape.

The various chucks which have been constructed up to the present day for glass working purposes, have the great defect of leaving to the objects mounted and centered in the chuck the possibility of oscillating to a certain extent. Moreover, such chucks are generally constructed for articles of glass of given shape and size and further they do not allow articles, gripped between their jaws, of taking any desired position, nor of rotating at any desired speed.

The object of the present invention is to overcome these defects.

According to the invention, the jaws of the chuck or work holder are mounted on slide bars through the medium of universal joints, whereby said jaws may be caused to take any convenient position, required to suit the shape and size of the article or work, and may be caused to slide to such an extent as to firmly grip said article or work.

According to a further feature of the invention, the slide bars are adapted to slide in guide ways formed in a stationary plate or disc and are actuated by bell crank levers, through the medium of ball or roller connections, the levers being pivoted on a bar connected to said plate or disc.

The bell crank levers are caused to pivot, according to the invention, by means of a bar acting thereon, through the medium of balls or rollers and against the action of springs, said bar being adapted to slide on a stationary element, rigidly connected to the plate or disc and to which the springs are fastened.

Articles which can be maintained and centered in a chuck according to the invention, may be of various kinds, such as tumblers, drinking glasses of the stem type having a glass or other base, vases, cylinders and the like. On the other hand, the chuck according to the invention may be mounted on machines of any type, such as machines for cutting, polishing, re-firing, bevelling or otherwise working the article.

The invention will be described hereafter, with reference to the figures of the accompanying drawing, which illustrate, merely by way of example, an embodiment of the invention:

Figs. 1, 2 and 3 are respectively front, side and plan views of a chuck according to the invention;

Figs. 4 and 5 are diagrammatic views showing two examples of application of the chuck.

With reference to Figs. 1, 2 and 3, a sleeve 1 is milled at its top end and has attached to it a stem or rod 2, movably placed inside a tube 7 forming the central part of the chuck. Inside the sleeve 1 is also arranged a spring 3, in such a way that, on pressing on the sleeve 1, an element 4, rigidly connected to the rod 2 by a pin 4', is moved downwards, the pin 4' sliding in a slot 6 of the tube 7. The element 4 comprises bars, extending at right angles to the tube 7 and at the free end of which balls or rollers are provided and adapted to press against bell crank levers 8, pivoted at 9 on balls or rollers provided at the end of bars 10, rigidly connected to the tube 7 and extending at right angles thereto.

The upper ends of the bell crank levers 9 are connected by springs 11 to the tube 7, said springs being so tensioned that, when the element 4 moves downwards and its balls or rollers glide along the upper arms of levers 8, these are caused to rotate about their pivot 9, their upper ends coming nearer to the tube 7. The lower ends of the levers 8 are connected, by means of a pin and slot connection 12, to slide bars 13, the pins consisting of balls or rollers. The slide bars 13 are caused to shift in guide ways 15 forming part of or rigidly secured to a plate or disc 14, rigidly connected to the tube 7 and at right angles thereto. The slide bars 13 are connected to the jaws 16 for gripping the work by means of universal joints 17.

When it is desired to insert an article between the jaws 16, a pressure is exerted on the sleeve 1, whereby the element 4 is lowered, the levers 8 pivot about their fulcrum 9 and the slide bars, together with the jaws 16, move outwardly or apart from one another. When the pressure on the sleeve 1 is released, the various parts come back to their original position, thanks to the action of the spring 3, and the jaws 16 firmly grip the work. When it is desired to remove the article, the pressure will again be exerted on the sleeve 1.

With reference to Figs. 4 and 5, it will be seen that the article 19 to be worked rests against the plate or disc 14 and is firmly maintained between the jaws 16, which, thanks to the joints 17, can take any position required to suit the size and shape of the article 19.

When it is desired to insert a drinking glass of the stem type, having a glass base, in the chuck, this glass will be either maintained in the apparatus by placing the glass base between the jaws 16 and the plate or disc 14, or by forming in the jaws 16 supplementary grooves.

In order to eliminate all possibility of the article sliding between the jaws 16, these may be lined with an asbestos covering.

When it is desired to mount the chuck on a machine of any type, the tube 7 may be provided with ball bearings 18.

I claim:

1. A chuck or work holder, more particularly for use in the working of glassware, comprising jaws for gripping the article, slide bars each connected to a jaw, universal joint connections between each jaw and slide bar, a stationary element formed with guide ways for each of said slide bars and means to slide the slide bars in said guide ways to move the jaws to and from their gripping position.

2. A chuck or work holder, more particularly for use in the working of glassware, comprising jaws for gripping the article, slide bars each connected to a jaw, universal joint connections between each jaw and slide bar, a stationary element formed with guide ways for each of said slide bars, means to slide the slide bars in said guide ways to move the jaws to and from their gripping position, and elastic means acting in opposition to said means.

3. A chuck or work holder, more particularly for use in the working of glassware, comprising jaws for gripping the article, slide bars each connected to a jaw, universal joint connections between each jaw and slide bar, a stationary member, guide ways for the slide bars secured to said member, bell crank levers pivotally mounted on said member, pivotal and slidable connections between each lever and slide bar and means to rock the levers and thereby shift the slide bars.

4. A chuck or work holder, more particularly for use in the working of glassware, comprising jaws for gripping the article, slide bars each connected to a jaw, universal joint connections between each jaw and slide bar, a stationary member, guide ways for the slide bars secured to said member, bell crank levers pivotally mounted on said member, pivotal and slidable connections between each lever and slide bar, rollers acting upon the levers to rock them, an element capable of being moved to and fro on said member and on which said rollers are mounted, springs connecting the levers to the member and normally acting in opposition to said element and means to move said element.

5. A chuck or work holder, more particularly for use in the working of glassware, comprising jaws for gripping the article, slide bars each connected to a jaw, universal joint connections between each jaw and slide bar, a stationary disc, a tubular shank projecting centrally at right angles from said disc, guide ways for said slide bars secured to said disc, bars projecting at right angles from said shank, bell crank levers pivoted on said bars, pivotal pin and slot connections between each slide bar and one end of each lever, a rod adapted to shift inside said tubular shank, arms parallel to said bars secured to said rod and adapted to act upon the levers, rollers at the end of said arms adapted to contact the levers and springs connecting the free ends of the levers with the tubular shank.

In testimony whereof I signed hereunto my name.

EDMOND PAUL.